(No Model.)

H. H. TEETER.
FILTER.

No. 497,991. Patented May 23, 1893.

Witnesses

Inventor
H. H. Teeter,
By his Attorneys,

UNITED STATES PATENT OFFICE.

HORACE H. TEETER, OF CARBONDALE, ILLINOIS.

FILTER.

SPECIFICATION forming part of Letters Patent No. 497,991, dated May 23, 1893.

Application filed December 9, 1891. Serial No. 414,517. (No model.)

*To all whom it may concern:*

Be it known that I, HORACE H. TEETER, a citizen of the United States, residing at Carbondale, in the county of Jackson and State of Illinois, have invented a new and useful Filter, of which the following is a specification.

The invention relates to improvements in filters or percolators for coffee pots.

The object of the present invention is to simplify and improve the construction of filters, and their attachment to the receiving vessel or coffee pot, and to prevent coffee grounds falling out of a filter when the coffee pot is tilted or inverted in pouring out coffee.

The invention consists in the construction and novel combination and arrangement of parts hereinafter fully described illustrated in the accompanying drawings and pointed out in the claim hereto appended.

This application is an improvement on Patent No. 329,505, granted to me November 3, 1885.

Figure 1:
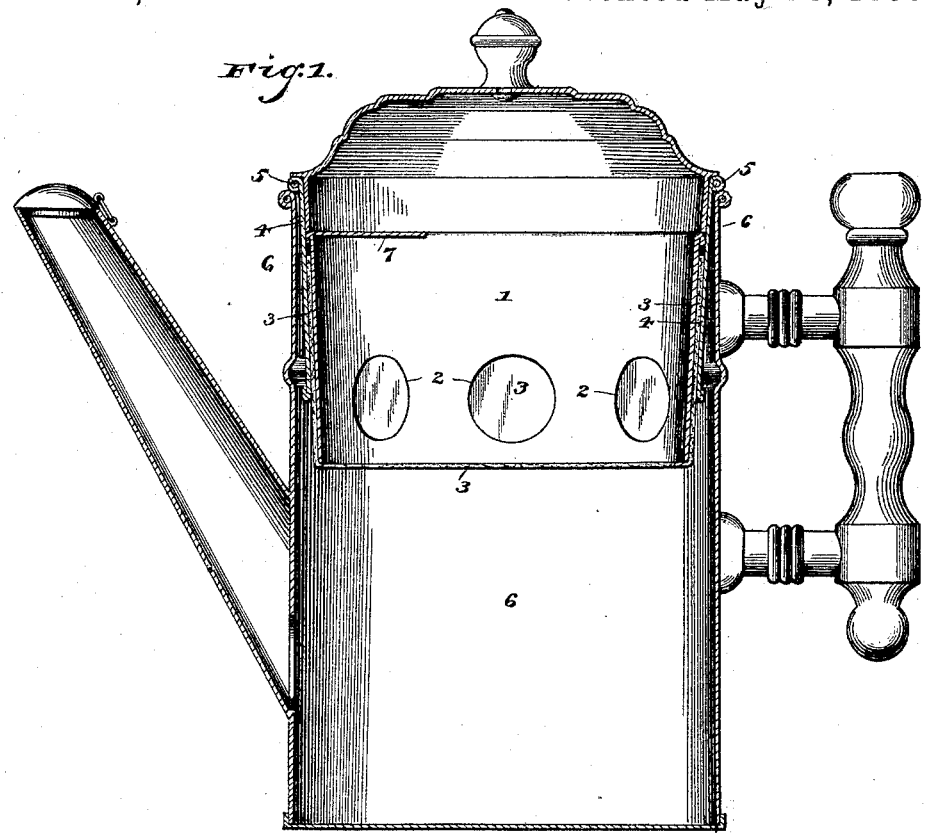
Figure 2:
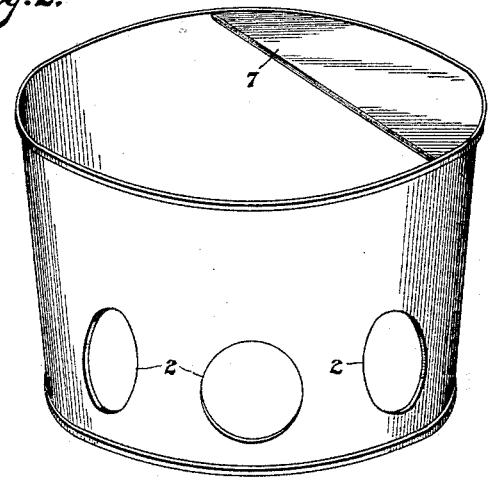

In the drawings—Figure 1 is a vertical sectional view of a coffee pot provided with a filter constructed in accordance with this invention. Fig. 2 is a detail perspective view of the filter tube.

Like numerals of reference indicate corresponding parts in both figures of the drawings.

1 designates a conical filter-tube which is provided in its sides near its lower end with openings 2 and around the lower end of which is drawn a filtering cloth 3. The filtering cloth 3 is clamped around the filter tube 1 by a conical band 4 which is slipped over the smaller end of the filter tube, and which is slightly larger than the filter tube, so as to expose the openings 2. The upper end of the clamping band 4 is provided with a circumferential flange 5, which rests upon the upper edge of a coffee pot 6 and which is preferably formed by a bead provided with a stiffening wire, but which may be of any preferred construction. The flange 5 forms a simple and efficient device for suspending a filter within a coffee pot or other vessel.

In order to prevent the grounds or other residue spilling out of the filter and striking the cover when the vessel is tilted or inverted, a segmental plate 7 is secured to the top of the filter tube and extends inward over the same.

After the filter is inserted in position, it will be seen that a cover or lid 8 is fitted to the coffee pot over said filter and that a circumferential flange 9 of said cover or lid is fitted snugly inside of said clamping-band 4, and is of such length as to bear on the upper flange or bead of the said filter-tube and hold the latter down in proper position against displacement by the movement of the coffee pot or the contents thereof. In addition the flange or rim of the said lid or cover bears on the bead 5 of the clamping-band 4, and serves as a further means to prevent disconnection of the several parts.

It will be seen that a simple, inexpensive and efficient filter for liquids, but especially decoctions, such as coffee is provided, that the means for suspending the filter within a vessel are simple and inexpensive, and that the grounds or residue are prevented spilling from the filter when the receiving vessel is tilted or inverted.

What I claim is—

In combination with a coffee pot, of a filter consisting of a filter-tube with openings in the lower portion thereof, having a filter-cloth stretched around its lower part and covering said openings therein and the bottom of the same, a clamping and supporting band or ring provided with an upper bead adapted to rest on the top edge or rim of the coffee pot to suspend the filter within the coffee pot, and said filter-tube having a segmental flange covering the front top portion thereof, and a lid or cover for the coffee pot having a depending flange adapted to bear upon the upper edge of the filter-tube to hold the latter down in place and fitted into the said clamping and supporting band or ring to provide a closed filtering attachment independent of the coffee pot, and which may be removed or placed in position simultaneously with the said cover or lid, substantially as herein described.

In testimony that I claim the foregoing as my own I have hereto affixed my signature in the presence of two witnesses.

HORACE H. TEETER.

Witnesses:
J. M. RICHART,
H. F. CAMPBELL.